(12) United States Patent  
Matsushima

(10) Patent No.: US 11,785,169 B2  
(45) Date of Patent: Oct. 10, 2023

(54) IMAGE PROCESSING APPARATUS, IMAGE PROCESSING METHOD, AND COMPUTER-READABLE MEDIUM

(71) Applicant: Yuki Matsushima, Kanagawa (JP)

(72) Inventor: Yuki Matsushima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/400,685

(22) Filed: Aug. 12, 2021

(65) Prior Publication Data

US 2022/0070335 A1 Mar. 3, 2022

(30) Foreign Application Priority Data

Aug. 31, 2020 (JP) .................................. 2020-145714

(51) Int. Cl.  
*H04N 1/60* (2006.01)

(52) U.S. Cl.  
CPC ............ *H04N 1/6022* (2013.01); *H04N 1/605* (2013.01); *H04N 1/6058* (2013.01)

(58) Field of Classification Search  
CPC .... H04N 1/6022; H04N 1/605; H04N 1/6058; H04N 1/60  
See application file for complete search history.

(56) References Cited

U.S. PATENT DOCUMENTS

| | | | | |
|---|---|---|---|---|
| 5,633,734 | A | * | 5/1997 | Lathrop ................... H04N 1/62 |
| | | | | 358/1.9 |
| 5,650,942 | A | * | 7/1997 | Granger ................... H04N 1/60 |
| | | | | 358/518 |
| 7,034,878 | B2 | | 4/2006 | Matsushima |
| 7,510,275 | B2 | | 3/2009 | Matsushima |
| 8,170,460 | B2 | | 5/2012 | Matsushima |

(Continued)

FOREIGN PATENT DOCUMENTS

| | | | | |
|---|---|---|---|---|
| CA | 2524390 C | * | 6/2012 | ............ B41M 3/008 |
| EP | 2884732 A1 | | 6/2015 | |

(Continued)

OTHER PUBLICATIONS

Extended European Search Report dated Nov. 16, 2021 issued in corresponding European Appln. No. 21193047.4.

*Primary Examiner* — Ted W Barnes  
(74) *Attorney, Agent, or Firm* — Harness, Dickey & Pierce P.L.C.

(57) ABSTRACT

An image processing apparatus includes: an acquisition unit configured to acquire a plurality of first color values in a device independent color space, from information defining a predetermined gamut; a setting unit configured to set predetermined first dot percentages of a fluorescent color for the plurality of first color values acquired by the acquisition unit; a calculation unit configured to calculate a second dot percentage of the fluorescent color, based on a relationship between the plurality of first color values and the first dot percentages, the second dot percentage corresponding to an arbitrary second color value in the color space; and a generation unit configured to generate a first profile to convert the second color value to dot percentages of a process color and the fluorescent color, based on the second color value and the second dot percentage calculated by the calculation unit.

20 Claims, 14 Drawing Sheets

(56) References Cited

U.S. PATENT DOCUMENTS

| | | |
|---|---|---|
| 2002/0024609 A1 | 2/2002 | Matsushima |
| 2003/0020974 A1 | 1/2003 | Matsushima |
| 2003/0099407 A1 | 5/2003 | Matsushima |
| 2004/0126009 A1 | 7/2004 | Takenaka et al. |
| 2005/0128491 A1* | 6/2005 | Kubo ................ H04N 1/6022 358/1.1 |
| 2005/0141763 A1 | 6/2005 | Matsushima |
| 2006/0188156 A1* | 8/2006 | Kwak .................. H04N 9/67 382/167 |
| 2007/0041637 A1 | 2/2007 | Matsushima |
| 2008/0002216 A1 | 1/2008 | Matsushima |
| 2009/0147313 A1 | 6/2009 | Miyagi et al. |
| 2009/0168108 A1 | 7/2009 | Matsushima |
| 2011/0304894 A1* | 12/2011 | Okano .................. H04N 1/40 358/530 |
| 2012/0043751 A1* | 2/2012 | Hersch ............... G07D 7/1205 101/212 |
| 2012/0120424 A1* | 5/2012 | Hirano ................. H04N 1/62 358/1.9 |
| 2014/0320927 A1* | 10/2014 | Kuo .................... H04N 1/54 358/2.1 |
| 2015/0077449 A1* | 3/2015 | Kobashi ............... H04N 1/52 347/7 |
| 2015/0161488 A1 | 6/2015 | Okumura |
| 2017/0337453 A1 | 11/2017 | Okumura |
| 2019/0260912 A1 | 8/2019 | Matsushima |
| 2021/0003451 A1* | 1/2021 | Morovic ............... G01J 3/462 |
| 2021/0029270 A1 | 1/2021 | Matsushima |
| 2021/0329144 A1* | 10/2021 | Matsushima .......... H04N 1/54 |

FOREIGN PATENT DOCUMENTS

| | | | |
|---|---|---|---|
| EP | 3896951 A1 | 10/2021 | |
| JP | 2004-291510 A | 10/2004 | |
| JP | 2004291508 A * | 10/2004 | ............ C09D 11/32 |
| JP | 2004291510 A * | 10/2004 | |
| JP | 2007011028 A * | 1/2007 | ............... H04N 1/52 |
| JP | 2011259388 A * | 12/2011 | ............... H04N 1/40 |
| JP | 6357744 B2 | 6/2018 | |
| JP | 6357744 B2 * | 7/2018 | ............ B41J 2/2056 |
| JP | 2019146167 A * | 8/2019 | ............ H04N 1/603 |
| JP | 2020145714 A * | 9/2020 | ........ G03G 15/0808 |
| JP | 2021-175183 A | 11/2021 | |

* cited by examiner

FIG.5

4-COLOR PROFILE (B TO A)

| L | a | b | C | M | Y | K |
|---|---|---|---|---|---|---|
| 100 | 0 | 0 | 0 | 0 | 0 | 0 |
| ⋮ | ⋮ | ⋮ | ⋮ | ⋮ | ⋮ | ⋮ |
| Lt | at | bt | c1 | m1 | y1 | k1 |
| ⋮ | ⋮ | ⋮ | ⋮ | ⋮ | ⋮ | ⋮ |
| 0 | 0 | 0 | 100 | 100 | 100 | 100 |

FIG.6

5-COLOR PROFILE (B TO A)

| L | a | b | C | M | Y | K | NM |
|---|---|---|---|---|---|---|----|
| 100 | 0 | 0 | 0 | 0 | 0 | 0 | 0 |
| ⋮ | ⋮ | ⋮ | ⋮ | ⋮ | ⋮ | ⋮ | ⋮ |
| Lt | at | bt | c2 | m2 | y2 | k2 | nm2 |
| ⋮ | ⋮ | ⋮ | ⋮ | ⋮ | ⋮ | ⋮ | ⋮ |
| 0 | 0 | 0 | 100 | 100 | 100 | 100 | 100 |

FIG.7

4-COLOR PROFILE (A TO B)

| C | M | Y | K | L | a | b |
|---|---|---|---|---|---|---|
| 0 | 0 | 0 | 0 | 100 | 0 | 0 |
| ⋮ | ⋮ | ⋮ | ⋮ | ⋮ | ⋮ | ⋮ |
| c1 | m1 | y1 | k1 | Lt | at | bt |
| ⋮ | ⋮ | ⋮ | ⋮ | ⋮ | ⋮ | ⋮ |
| 100 | 100 | 100 | 100 | 0 | 0 | 0 |

FIG.8

5-COLOR PROFILE (A TO B)

| C | M | Y | K | NM | L | a | b |
|---|---|---|---|----|---|---|---|
| 0 | 0 | 0 | 0 | 0 | 100 | 0 | 0 |
| ⋮ | ⋮ | ⋮ | ⋮ | ⋮ | ⋮ | ⋮ | ⋮ |
| c2 | m2 | y2 | k2 | nm2 | Lt | at | bt |
| ⋮ | ⋮ | ⋮ | ⋮ | ⋮ | ⋮ | ⋮ | ⋮ |
| 100 | 100 | 100 | 100 | 100 | 0 | 0 | 0 |

IMAGE PROCESSING APPARATUS, IMAGE PROCESSING METHOD, AND COMPUTER-READABLE MEDIUM

CROSS-REFERENCE TO RELATED APPLICATIONS

The present application claims priority under 35 U.S.C. § 119 to Japanese Patent Application No. 2020-145714, filed on Aug. 31, 2020. The contents of which are incorporated herein by reference in their entirety.

BACKGROUND OF THE INVENTION

1. Field of the Invention

The present invention relates to an image processing apparatus, an image processing method, and a computer-readable medium.

2. Description of the Related Art

In general, an image that is recorded using process colors based on subtractive color mixing by a copier, a printer, or the like has a narrower color reproduction range than an image that is output based on additive color mixing by a display or the like. Color reproduction using the process colors is based on subtractive color mixing, so that with repetition of mixture of color materials with an attempt to reproduce a bright color, lightness is reduced and the color is darkened. Therefore, to expand the color reproduction range and improve hues, studies to search for color materials or use fluorescent materials have been conducted, for example. Here, the process colors indicate four plates of cyan (C), magenta (M), yellow (Y), and black (K). If subtractive color mixing is performed using a fluorescent color material (fluorescent ink, fluorescent toner, or the like) to which a fluorescent substance is added, it is possible to reproduce colors with higher lightness and higher saturation as compared to a state in which the fluorescent substance is not added (CMYK process colors), and it is expected to expand the color reproduction range.

For example, fluorescent magenta is known as representative fluorescent ink. Spectral distribution characteristics of fluorescent magenta (hereinafter, may be referred to as "NM" (Neon Magenta)) and magenta as the process color (hereinafter, may be referred to as "M") are illustrated in FIG. 19 and features will be described below. The first feature is that the two kinds of ink have absorption spectrum peaks in approximately the same band. The second feature is that the NM ink has a fluorescent spectrum peak on the long wavelength side of the absorption spectrum peak.

In the marketplace, fluorescent ink is beginning to be used in offset printers and fluorescent toner is beginning to be used in electronic photographic equipment. In the offset printers, for example, ink for which toning is performed by adding fluorescent magenta to magenta is generated in advance, and the ink is used in place of magenta ink. In this case, it is possible to generate image data by using the same process colors as in the conventional technique. In contrast, in the electronic photographic equipment, toner is handled for each of colors, and therefore, with respect to image data, a fifth plate for fluorescent magenta is needed in addition to plates for the process colors. In electronic submission, a submission condition is that data that can be subjected to a printing process without being processed, modified, or adjusted in a printing company as a submission destination has to be provided, and therefore, a designer who performs submission needs to generate the fifth plate on his/her own. However, generating the fifth plate in a single-handed way by using a limited application is a large burden. Therefore, there is a need for a function that makes it possible to easily decompose image data that is submitted as four plates into five plates or a function that makes it possible to easily designate colors that are printable by inclusion of fluorescent toner.

As a technique for using the fluorescent color material in place of the process color as described above, a technique in which when CMYK process colors are decomposed into CMYK, light cyan (LC), and light magenta (LM), LC ink is added such that the amount thereof is maximum in a gray-to-gray area (around 75 to 95%) in which C ink increases and such that the LC ink is reduced in a highly saturated area (95% or higher) in order to reduce density unevenness is disclosed (for example, Japanese Patent No. 6357744).

However, if the fluorescent color material of the same color system is used in place of the process color as in the conventional technique, although there is an advantage in that the color is not darkened, it is difficult to define a color value because of a lack of a colorimetry criterion, and there is a problem in that it is difficult to establish a color conversion algorithm. Further, due to the situation as described above, a method of manually generating a fluorescent plate when generating image data is generally adopted and a certain skill is needed at the time of generating the image data.

SUMMARY OF THE INVENTION

According to an aspect of the present invention, an image processing apparatus includes an acquisition unit, a setting unit, a calculation unit, and a generation unit. The acquisition unit is configured to acquire a plurality of first color values in a device independent color space, from information defining a predetermined gamut. The setting unit is configured to set predetermined first dot percentages of a fluorescent color for the plurality of first color values acquired by the acquisition unit. The calculation unit is configured to calculate a second dot percentage of the fluorescent color, based on a relationship between the plurality of first color values and the first dot percentages, the second dot percentage corresponding to an arbitrary second color value in the color space. The generation unit is configured to generate a first profile to convert the second color value to dot percentages of a process color and the fluorescent color, based on the second color value and the second dot percentage calculated by the calculation unit.

BRIEF DESCRIPTION OF THE DRAWINGS

FIG. 5 is a diagram illustrating an example of a B to A table for a 4-color profile;

FIG. 6 is a diagram illustrating an example of a B to A table for a 5-color profile;

FIG. 7 is a diagram illustrating an example of an A to B table for the 4-color profile;

FIG. 8 is a diagram illustrating an example of an A to B table for the 5-color profile;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
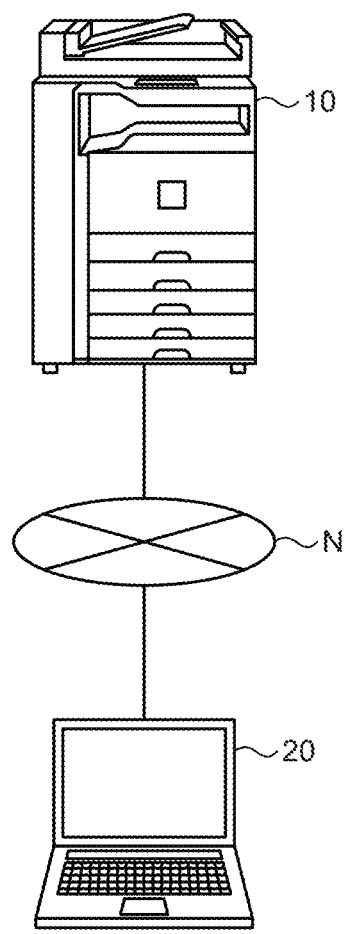
FIG. 1 is a diagram illustrating an example of a configuration of a system including an image forming apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an image processing apparatus, an image processing method, and a computer-readable medium capable of easily generating image data when a fluorescent color different from process colors is used.

Embodiments of an image processing apparatus, an image processing method, and a computer readable recording medium according to the present invention will be described in detail below with reference to the drawings. The present invention is not limited by the embodiments below, and structural elements in the embodiments below include one that can easily be thought of by a person skilled in the art, one that is practically identical, and one that is within an equivalent range. In addition, structural elements may be omitted, replaced, modified, or combined in various forms within the scope not departing from the gist of the embodiments described below.

First Embodiment

As in an offset printer, by using a small amount of a fluorescent color in a mixed manner in a process color, it is possible to prevent even a highly saturated color from being darkened and to create a bright impression. In this case, priority is given to visual impression of the color rather than numerical accuracy; therefore, for example, it is sufficient to distribute a device value of magenta to magenta and fluorescent magenta. Actual color conversion is performed based on an International color consortium (ICC) profile that is defined by the ICC. Meanwhile, various color matching technologies, such as a profile generation method and a color adjustment method, as a color management means for a printed material are disclosed. The color matching technologies as described above are applicable not only to a printer of an electrophotographic system, but also to general digital printers including an inkjet type, a thermal type, and the like and peripheral apparatuses in a cross-sectional manner. In the present embodiment, an example of color conversion using a profile will be described in detail below.

As an overview of the present embodiment, to generate a 5-color profile, a device value of a fluorescent color is set on a color space instead of being simply distributed from a device value of a process color. With this method, it is possible to more flexibly set an amount of fluorescent toner with respect to a total amount of toner. Here, the 5-color profile is formed of a source profile and a printer profile, where the source profile defines a correspondence relationship of Lab values corresponding to grid points of C, M, Y, K, and NM to be input, and the printer profile defines a correspondence relationship of values of C, M, Y, K, and NM corresponding to grid points of L, a, and b to be input. Here, the Lab values are color values in a Lab color space. A controller of an image forming apparatus according to the present embodiment performs color conversion from a CMYK image to a CMYK+NM image by using a 4-color profile and the 5-color profile. In this case, a gamut (a color gamut or a color reproduction range) expected to be used in an input image is approximately equal to a gamut based on process colors in an output apparatus, and therefore, it is sufficient to set a device value of a fluorescent color (for example, fluorescent magenta) in a range of the gamut.

System Including Image Forming Apparatus

FIG. 1 is a diagram illustrating an example of a configuration of a system including the image forming apparatus according to a first embodiment. The configuration of the system including an image forming apparatus 10 according to the present embodiment will be described below with reference to FIG. 1.

The system illustrated in FIG. 1 includes the image forming apparatus 10 and a personal computer (PC) 20. The image forming apparatus 10 and the PC 20 are able to communicate with each other via a network N.

The image forming apparatus 10 is an apparatus that performs image formation (printing) on the basis of image data received from outside or image data that is stored in a storage device thereof. The image forming apparatus 10 is, for example, a multifunction peripheral (MFP) and is one example of the image processing apparatus.

The PC 20 is an information processing apparatus that transmits image data that is generated or selected and a print command on the image data to the image forming apparatus 10 in accordance with operation performed by a user. Meanwhile, the PC 20 is not limited to a PC, but may be, for example, an information processing apparatus, such as a smartphone, a tablet terminal, or a scanner. Further, the PC 20 (the information processing apparatus) may include a program for generating the 5-color profile and setting the device value of the fluorescent color, transmit the generated 5-color profile, the device value of the fluorescent color, and data, such as a table, to the image forming apparatus 10 (the image processing apparatus), or provide the generated 5-color profile, the device value of the fluorescent color, and the data, such as a table, to the image forming apparatus 10 (the image processing apparatus) via a portable storage medium (a universal serial bus (USB) memory, a compact disc-read only memory (CD-ROM) or the like), a Web site, a cloud computing service, or the like. Alternatively, the PC 20 (the information processing apparatus) may implement all or a part of functions of a controller 200 (to be described later) including generation of the 5-color profile, color conversion, and image output.

Meanwhile, the configuration of the system illustrated in FIG. 1 is one example, and may include, for example, a print server that manages a print job including image data that is output from the PC 20.

Hardware Configuration of Image Forming Apparatus

Figure 2:
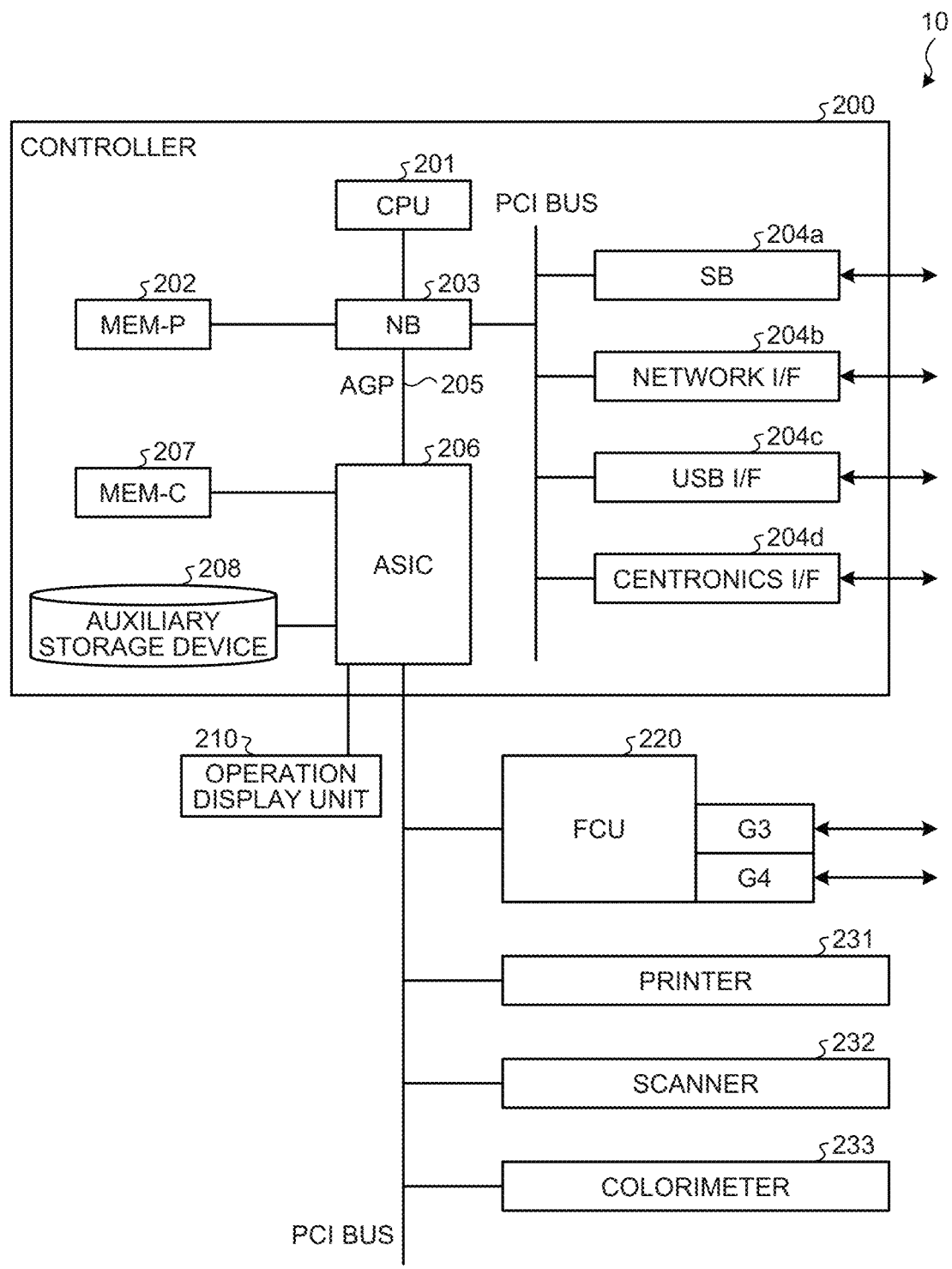
FIG. 2 is a diagram illustrating an example of a hardware configuration of the image forming apparatus according to the first embodiment.

FIG. 2 is a diagram illustrating an example of a hardware configuration of the image forming apparatus according to the first embodiment. The hardware configuration of the image forming apparatus 10 according to the present embodiment will be described below with reference to FIG. 2.

As illustrated in FIG. 2, the image forming apparatus 10 according to the present embodiment includes the controller 200, an operation display unit 210, a facsimile control unit (FCU) 220, a printer 231 (printing apparatus), a scanner 232, and a colorimeter 233, all of which are connected to one another via a peripheral component interface (PCI) bus.

The controller 200 is a device that controls the entire image forming apparatus 10, drawing, communication, and input from the operation display unit 210.

The operation display unit 210 is a device, such as a touch panel, that receives input to the controller 200 (input function) and displays a state of the image forming apparatus 10 or the like (display function), and is directly connected to an application specific integrated circuit (ASIC) 206.

The FCU 220 is a device that implements a facsimile function, and is connected to the ASIC 206 via the PCI bus, for example.

The printer 231 is a device that implements a printing function, and is connected to the ASIC 206 via the PCI bus, for example. The scanner 232 is a device that implements a scanner function, and is connected to the ASIC 206 via the PCI bus, for example. The colorimeter 233 is a device that performs color measurement on an image printed on a recording medium, acquires a color value in a device independent color space (for example, the Lab color space) as a color measurement value, and is connected to the ASIC 206 via the PCI bus, for example.

The controller 200 includes a central processing unit (CPU) 201, a system memory (MEM-P) 202, a north bridge (NB) 203, a south bridge (SB) 204a, a network interface (I/F) 204b, a USB I/F 204c, a Centronics I/F 204d, the ASIC 206, a local memory (MEM-C) 207, and an auxiliary storage device 208.

The CPU 201 controls the entire image forming apparatus 10, is connected to a chipset including the system memory 202, the north bridge 203, and the south bridge 204a, and is connected to other devices via the chipset.

The system memory 202 is a memory that is used as a memory for storing a program and data, a memory for loading a program and data, and a drawing memory for a printer, and includes a ROM and a random access memory (RAM). The ROM is a read only memory that is used as the memory for storing a program and data, and the RAM is a writable and readable memory that is used as the memory for loading a program and data, the drawing memory for a printer, and the like.

The north bridge 203 is a bridge for connecting the CPU 201, the system memory 202, the south bridge 204a, and an accelerated graphics port (AGP) bus 205, includes a memory controller that controls read, write, and the like with respect to the system memory 202, and includes a PCI master and an AGP target.

The south bridge 204a is a bridge for connecting the north bridge 203, a PCI device, and a peripheral device. The south bridge 204a is connected to the north bridge 203 via a PCI bus. The network I/F 204b, the USB I/F 204c, the Centronics I/F 204d, and the like are connected to the PCI bus.

The AGP bus 205 is a bus interface for a graphics accelerator card introduced to speed up graphics processing. The AGP bus 205 is a bus that allows direct access to the system memory 202 with a high throughput, thereby speeding up operation related to the graphics accelerator card.

The ASIC 206 is an integrated circuit (IC) used for image processing including a hardware element for image processing, and has a function as a bridge to connect the AGP bus 205, the PCI bus, the auxiliary storage device 208, and the local memory 207 to one another. The ASIC 206 includes a PCI target and an AGP master; an arbiter (ARB) that is the central core of the ASIC 206; a memory controller that controls the local memory 207; a plurality of direct memory access controllers (DMACs) that rotate image data by using hardware logic or the like; and a PCI unit that performs data transfer between the printer 231 and the scanner 232 via the PCI bus. The FCU 220, the printer 231, the scanner 232, and the colorimeter 233 are connected to the ASIC 206 via a PCI bus, for example. Further, the ASIC 206 is connected to a host PC, a network, and the like (not illustrated).

The local memory 207 is a memory used as a copy image buffer and a code buffer.

The auxiliary storage device 208 is a storage device, such as a hard disk drive (HDD), a solid state drive (SSD), a secure digital (SD) card, or a flash memory, and is a storage for accumulating image data, accumulating programs, accumulating font data, and accumulating forms.

Meanwhile, a program of the image forming apparatus 10 as described above may be distributed by being recorded in a computer readable recording medium (the auxiliary storage device 208 or the like) in a computer-installable or computer-executable file format.

Further, the colorimeter 233 performs data communication with the controller 200 via the PCI bus, but embodiments are not limited to this example, and the colorimeter 233 may be able to perform data communication with the controller 200 over a network via the network I/F 204b.

Furthermore, the hardware configuration of the image forming apparatus 10 illustrated in FIG. 2 is one example, and it is not necessary to provide all of the devices and it may be possible to include other devices.

Figure 3:
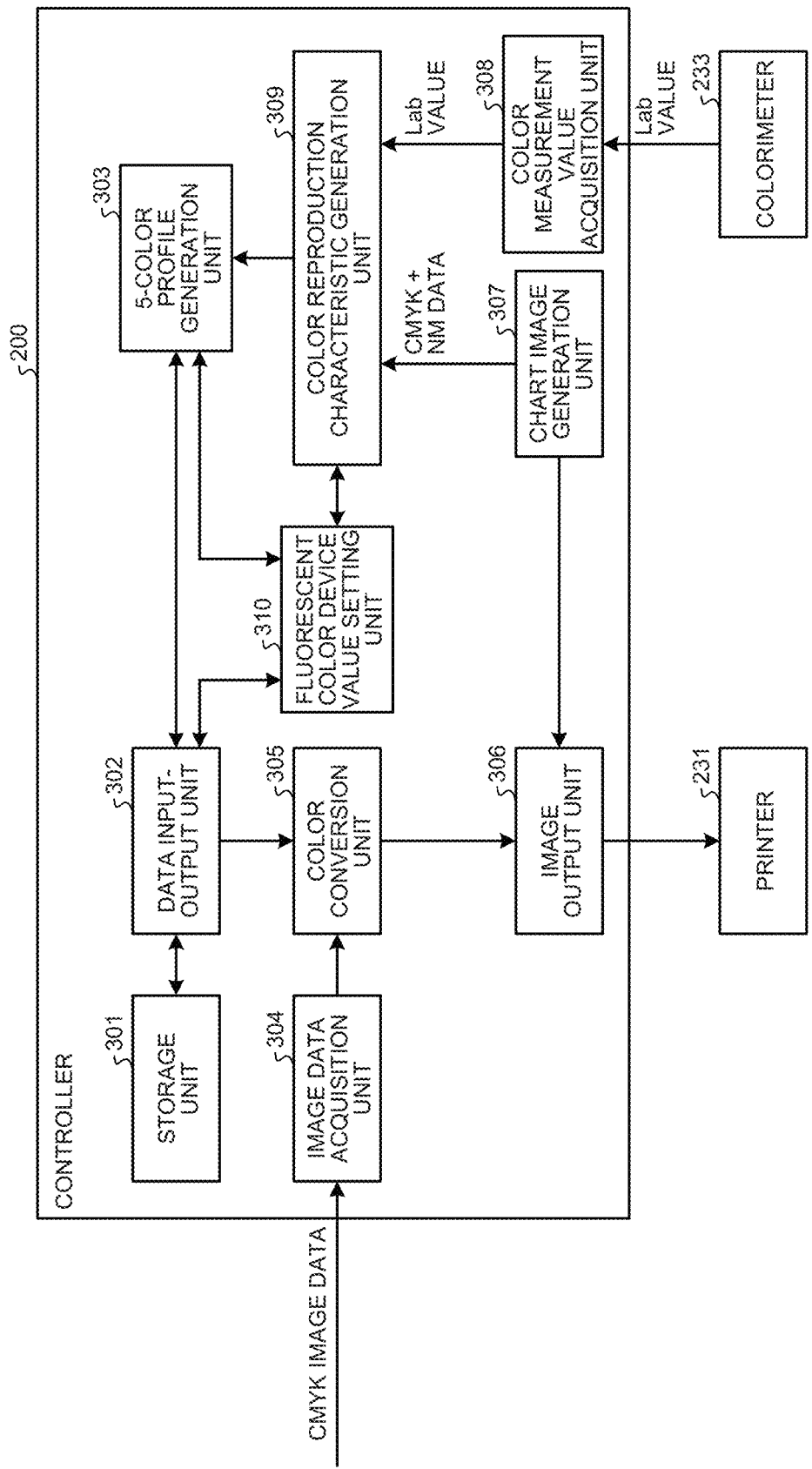
FIG. 3 is a diagram illustrating an example of a configuration of functional blocks of a controller of the image forming apparatus according to the first embodiment.
Figure 4:
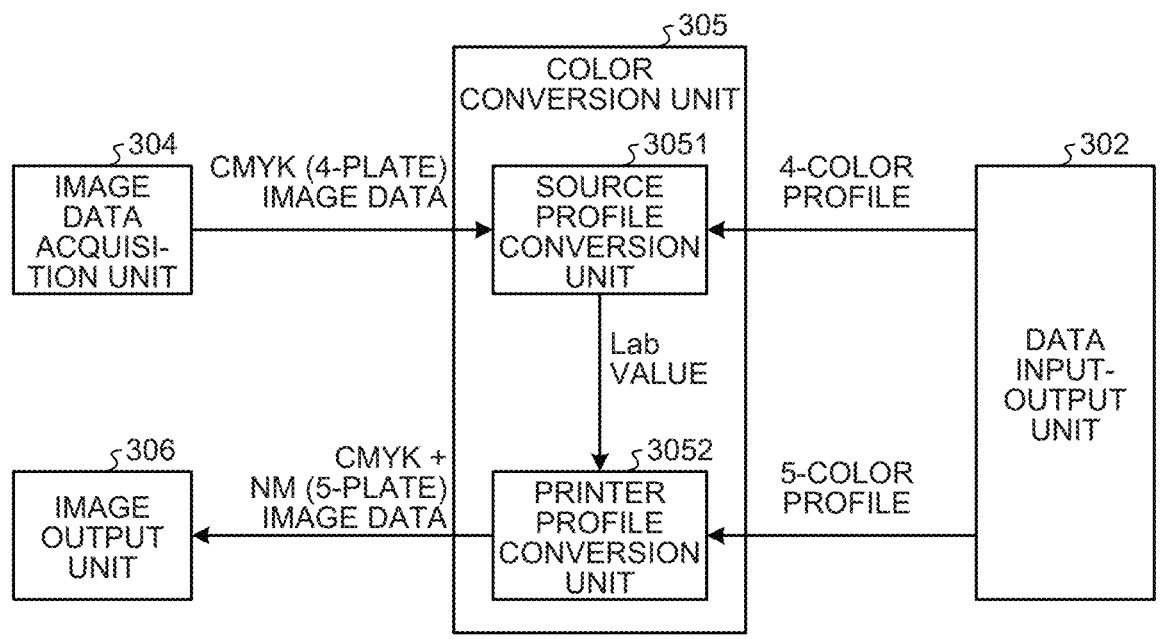
FIG. 4 is a diagram illustrating an example of a configuration of functional blocks of a color conversion unit of the controller of the image forming apparatus according to the first embodiment.
Figure 9:
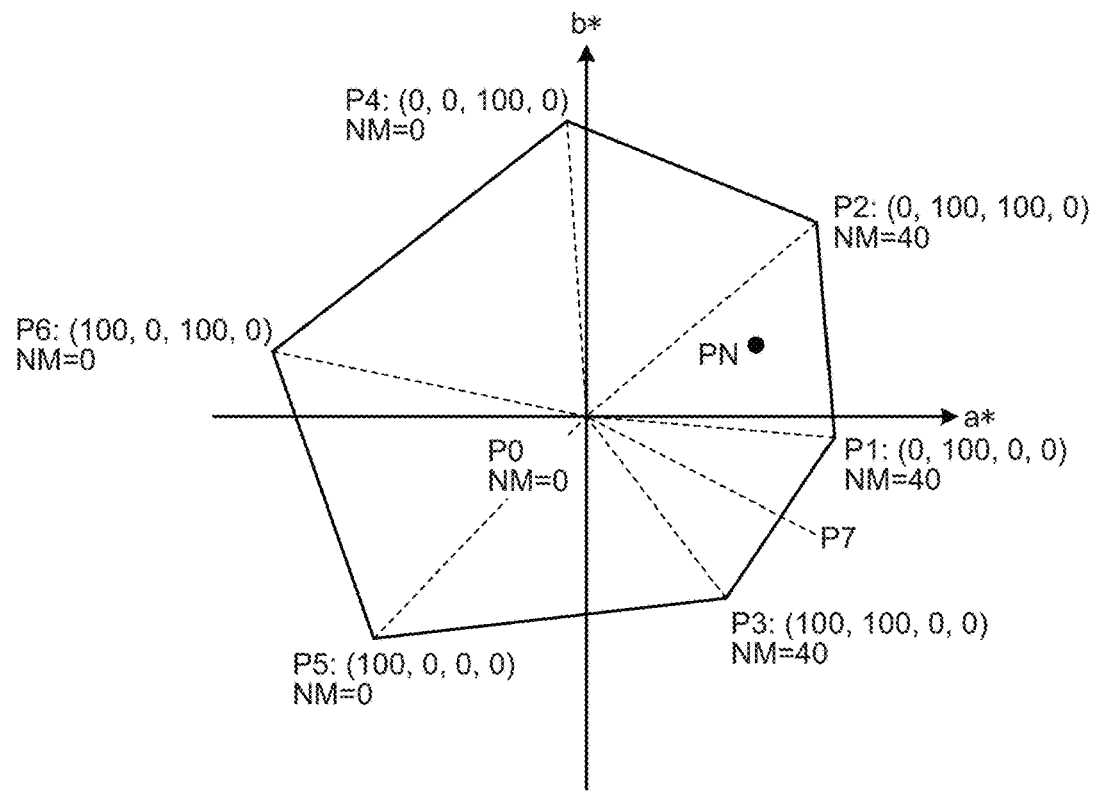
FIG. 9 is a diagram illustrating an example of NM setting results for primary colors and secondary colors on an ab plane of coordinates.
Figure 10:
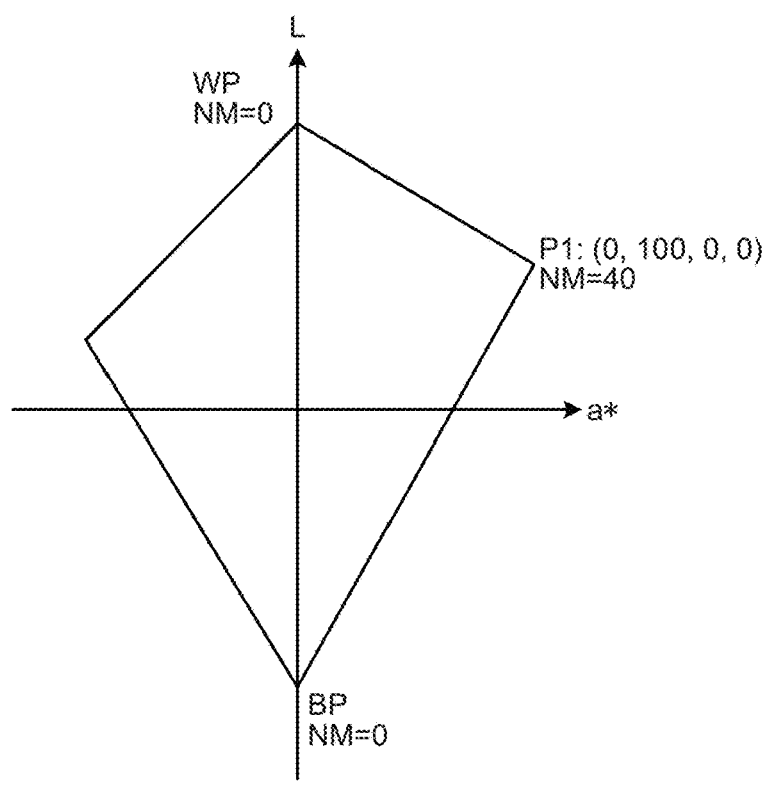
FIG. 10 is a diagram for explaining a gamut in a three-dimensional Lab color space.
Figure 11:
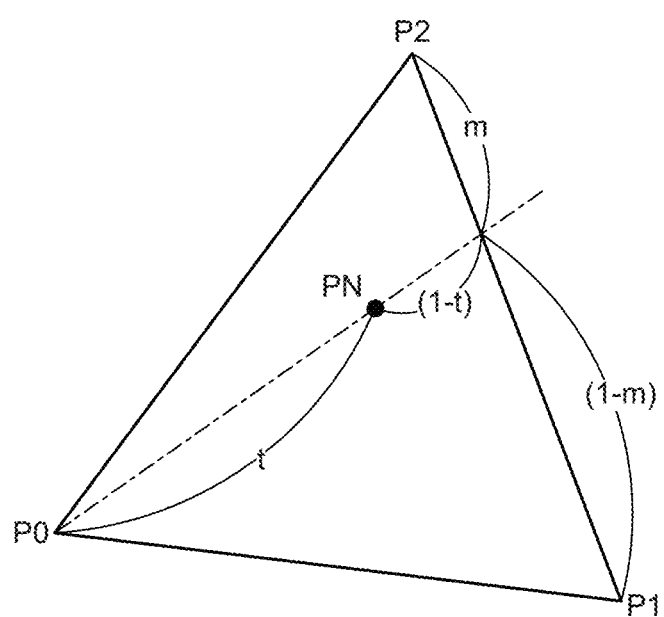
FIG. 11 is a diagram for explaining a process of calculating a device value of fluorescent magenta by linear interpolation in the first embodiment.

Configuration and Operation of Functional Blocks of Controller of Image Forming Apparatus FIG. 3 is a diagram illustrating an example of a configuration of functional blocks of the controller of the image forming apparatus according to the first embodiment. FIG. 4 is a diagram illustrating an example of a configuration of functional blocks of a color conversion unit of the image forming apparatus according to the first embodiment. FIG. 5 is a diagram illustrating an example of a B to A table for the 4-color profile. FIG. 6 is a diagram illustrating an example of a B to A table for the 5-color profile. FIG. 7 is a diagram illustrating an example of an A to B table for the 4-color profile. FIG. 8 is a diagram illustrating an example of an A to B table for the 4-color profile. FIG. 9 is a diagram illustrating an example of NM setting results for primary colors and secondary colors on an ab plane of coordinates. FIG. 10 is a diagram for explaining a gamut in a three-dimensional Lab color space. FIG. 11 is a diagram for explaining a process of calculating a device value of fluorescent magenta by linear interpolation in the first embodiment. With reference to FIG. 3 to FIG. 11, the configuration and the operation of the functional blocks of the controller 200 of the image forming apparatus 10 according to the present embodiment will be described below.

As illustrated in FIG. 3, the controller 200 of the image forming apparatus 10 includes a storage unit 301, a data input-output unit 302, a 5-color profile generation unit 303 (generation unit), an image data acquisition unit 304, a color conversion unit 305, an image output unit 306, a chart image generation unit 307, a color measurement value acquisition unit 308, a color reproduction characteristic generation unit 309, a fluorescent color device value setting unit 310 (an acquisition unit, a setting unit, and a calculation unit).

The storage unit 301 is a functional unit that stores therein an ICC profile for four colors (4-color profile), an ICC profile for five colors (5-color profile) that is generated by the 5-color profile generation unit 303, and the like. The storage unit 301 is implemented by the auxiliary storage device 208 illustrated in FIG. 2.

The data input-output unit 302 is a functional unit that reads data from the storage unit 301 and writes data to the storage unit 301. The data input-output unit 302 is implemented by, for example, a program that is executed by the CPU 201 illustrated in FIG. 2.

The 5-color profile generation unit 303 is a functional unit that receives the 4-color profile from the storage unit 301 via the data input-output unit 302, obtains a device value of each of CMYK and fluorescent magenta (NM) by using a color reproduction characteristic generated by the color reproduction characteristic generation unit 309 and an NM device value table generated by the fluorescent color device value setting unit 310, and generates the 5-color profile (first profile). Here, the device value indicates a dot percentage that is a ratio of a halftone dot area per unit area. For example, the 5-color profile generation unit 303 obtains, from the B to A table for the 4-color profile (for example, the B to A table illustrated in FIG. 5), the device values of CMYK and fluorescent magenta (NM) by using the color reproduction characteristic and the NM device value table, and generates the B to A table for the 5-color profile (for example, the B to A table illustrated in FIG. 6). Further, the 5-color profile generation unit 303 calculates, from the A to B table for the 4-color profile (for example, the A to B table illustrated in FIG. 7), Lab values by using the color reproduction characteristic, and generates the A to B table for the 5-color profile (for example, the A to B table illustrated in FIG. 8). The 5-color profile generation unit 303 stores the generated 5-color profile in the storage unit 301 via the data input-output unit 302. The 5-color profile generation unit 303 is implemented by, for example, a program that is executed by the CPU 201 illustrated in FIG. 2.

The fluorescent color device value setting unit 310 is a functional unit that receives the 4-color profile (the A to B table) from the storage unit 301 via the data input-output unit 302, sets a device value of fluorescent magenta (NM) in the Lab color space that is a device independent color space, and obtains the device value of NM corresponding to a Lab value at a grid point in the 4-color profile (the B to A table) by linear interpolation.

FIG. 5 illustrates the B to A table for the 4-color profile. FIG. 7 illustrates the A to B table for the 4-color profile. Here, "B to A" indicates conversion from a Lab value to a CMYK value (or CMYK+NM value), and "A to B" (to be described later) indicates conversion from a CMYK value (or CMYK+NM value) to a Lab value. Here, the CMYK value is device values of C, M, Y, and K, and the CMYK+NM value is device values of C, M, Y, K, and NM (fluorescent magenta). In the present embodiment, a gamut based on process colors of a target output apparatus is recognized from information on the 4-color profile, and the device value of fluorescent magenta is set based on the gamut. The gamut can be obtained from the A to B table for the 4-color profile (one example of information defining a gamut or a second profile). The fluorescent color device value setting unit 310 acquires, from the A to B table for the 4-color profile, device values (CMYK values) and Lab values (one example of first color values) defined at following points P1 to P6 in the Lab color space, as Lab values corresponding to the device values. Here, for example, the Lab value at the point P1 is represented by Lab(P1).

P1: (C, M, Y, K)=(0, 100, 0, 0)
P2: (C, M, Y, K)=(0, 100, 100, 0)
P3: (C, M, Y, K)=(100, 100, 0, 0)
P4: (C, M, Y, K)=(0, 0, 100, 0)
P5: (C, M, Y, K)=(100, 0, 0, 0)
P6: (C, M, Y, K)=(100, 0, 100, 0)

FIG. 9 illustrates the points P1 to P6 plotted on the ab plane of coordinates in the Lab color space. Among the points, the points P1, P4, and P5 correspond to hues of magenta (M), yellow (Y), and cyan (C) that are primary colors of the process colors, and the points P2, P3, and P6 correspond to hues of red, blue, and green that are secondary colors. Further, in FIG. 9, a point P7 indicates a Lab value for which the device value of fluorescent magenta (NM) is 100%, and a point P0 represents an origin.

Furthermore, it is ideal that the device value of fluorescent magenta is set to about 40% of a magenta plate. Therefore, assuming that the device value of fluorescent magenta is represented by NM, the fluorescent color device value setting unit 310 sets NM=0 [%] at each of the points P0 (origin), P4, P5, and P6 and sets NM=40 [%] at each of the points P1, P2, and P3 in the ab plane of coordinates. In other words, the fluorescent color device value setting unit 310 sets the device value (first dot percentage) (40 [%] in the example in FIG. 9) to actively use a fluorescent magenta color material for neighboring hues (the points P1, P2, and P3 in the example in FIG. 9) in a magenta plate or a fluorescent magenta plate. For example, the fluorescent color device value setting unit 310 sets a predetermined value (40 [%] in the example in FIG. 9) other than zero as the device value of fluorescent magenta at each of the points (the points P1, P2, and P3 in the example in FIG. 9) at which the device value of magenta that is the process color in the same color system as fluorescent magenta is not zero. Further, the fluorescent color device value setting unit 310 sets 0 [%] as the device value of fluorescent magenta at each of the points (the points P4, P5, and P6 in the example in FIG. 9) at which the device value of magenta that is the process color in the same color system as fluorescent magenta is zero. Furthermore, the fluorescent color device value setting unit 310 sets a smaller device value of fluorescent magenta (first dot percentage) (NM=0 [%] at the point P0 in the example in FIG. 9) with a decrease in saturation, that is, with an approach to an achromatic color side. Then, the fluorescent color device value setting unit 310 calculates a device value of fluorescent magenta (second dot percentage) at each of arbitrary points (Lab values) (second color values) in the gamut of the Lab color space defined by the points P1 to P6 (the ab plane of coordinates in FIG. 9), by linear interpolation using the points P0 to P7.

Moreover, the actual gamut is developed in the three-dimensional Lab space as described above. FIG. 10 illustrates a plane of coordinates defined by an L-axis (lightness) and an a-axis, where the point P1, a point WP at which (C, M, Y, K)=(0, 0, 0, 0) (maximum lightness point), and a point BP at which (C, M, Y, K)=(100, 100, 100, 100) (minimum lightness point) are illustrated. In this case, the device value of fluorescent magenta at the point WP and the point BP needs to be set such that NM=0 [%]. In other words, the fluorescent color device value setting unit 310 performs setting such that NM=0 [%] at each of points on an achromatic color axis (L-axis), and performs calculation by linear interpolation using the points P0 to P7, the point WP, and the point BP (one example of the first color values) at the other points in the gamut. A process of calculating the device value of fluorescent magenta based on linear interpolation by the fluorescent color device value setting unit 310 will be described below.

For example, as illustrated in FIG. 11, a device value NMn of fluorescent magenta at a point PN in the ab plane of coordinates can be calculated by Expression (1) (interpolant) below using device values NM1, NM2, NM0 (=0 [%]) of fluorescent magenta at the points P1, P2, and P0 (origin) that form a triangle enclosing the point PN.

$$NMn = NMn' \times t \quad (1)$$

(where, NMn'=m×NM1+(1−m)×NM2)

m and t in above Expression is a ratio of internal division (internal division ratio) in the triangle formed by the points P1, P2, and P0 as illustrated in FIG. 11. Meanwhile, a figure used for calculating the device value NMn of fluorescent magenta at the point PN is not limited to a triangle that is formed by three points so as to enclose the point PN, but the calculation may be performed based on a figure that is formed by four or more points so as to enclose the point PN.

In reality, the fluorescent color device value setting unit 310 calculates the device values of fluorescent magenta by linear interpolation as described above with respect to all of Lab values corresponding to all of grid points in the B to A table for the 4-color profile as illustrated in FIG. 5, and generates an NM device value table in which the Lab values are associated with the calculated device values of fluorescent magenta. Meanwhile, details of the process of generating the NM device value table by the fluorescent color device value setting unit 310 will be described later with reference to FIG. 12. The fluorescent color device value setting unit 310 stores the generated NM device value table in the storage unit 301 via the data input-output unit 302. The fluorescent color device value setting unit 310 is implemented by, for example, a program that is executed by the CPU 201 illustrated in FIG. 2.

Meanwhile, the fluorescent color device value setting unit 310 obtains the device value of NM corresponding to the Lab value at a grid point in the 4-color profile (the B to A table) by linear interpolation, but an interpolation process is not limited to linear interpolation, and other interpolation processes, such as Lagrange interpolation or spline interpolation, may be used.

The image data acquisition unit 304 is a functional unit that acquires CMYK image data from, for example, the PC 20 or the like via the network N. The image data acquisition unit 304 sends the acquired CMYK image data to the color conversion unit 305. The image data acquisition unit 304 is implemented by, for example, a program that is executed by the CPU 201 illustrated in FIG. 2.

The color conversion unit 305 is a functional unit that acquires the CMYK image data from the image data acquisition unit 304, acquires the 4-color profile and the 5-color profile from the storage unit 301 via the data input-output unit 302, and performs color conversion from 4-plate CMYK image data to 5-plate CMYK+NM image data (one example of second image data) that depends on the printer (the printer 231), by using the acquired 4-color profile and the acquired 5-color profile. As the CMYK+NM image data, for example, color data that is generated by changing the device value of each of C, M, Y, K, and NM in a range from 0 to 100 as described above.

The color conversion unit 305 includes, as illustrated in FIG. 4, a source profile conversion unit 3051 and a printer profile conversion unit 3052.

The source profile conversion unit 3051 is a functional unit that acquires the 4-color profile from the storage unit 301 via the data input-output unit 302, and converts a CMYK value of each of pixels included in the 4-plate CMYK image data acquired from the image data acquisition unit 304 to a Lab value by using the 4-color profile. The source profile conversion unit 3051 sends the converted Lab value to the printer profile conversion unit 3052.

The printer profile conversion unit 3052 is a functional unit that acquires the 5-color profile from the storage unit 301 via the data input-output unit 302, converts the Lab value received from the source profile conversion unit 3051 to the CMYK+NM value by using the 5-color profile, and generates 5-plate image data. The printer profile conversion unit 3052 sends the converted 5-plate CMYK+NM image data to the image output unit 306.

The color conversion unit 305 is implemented by, for example, a program that is executed by the CPU 201 illustrated in FIG. 2.

The image output unit 306 is a functional unit that outputs the CMYK+NM image data obtained through the color conversion performed by the color conversion unit 305 to the printer (the printer 231) and causes the printer to perform printing. The image output unit 306 is implemented by, for example, a program that is executed by the CPU 201 illustrated in FIG. 2.

The chart image generation unit 307 is a functional unit that holds chart data for obtaining a color reproduction characteristic of the printer (the printer 231), and generates chart data as image data in a portable document format (PDF) format (hereinafter, referred to as chart image data). Here, the chart data is data in which each of C, M, Y, K, and NM is combined for each predetermined gradation value, and, for example, if the gradation value is set every 20% per single color, the chart data is data including $6^5=7776$ patches. The chart image generation unit 307 sends the generated chart image data to the color reproduction characteristic generation unit 309 and the image output unit 306. The chart image generation unit 307 is implemented by, for example, a program that is executed by the CPU 201 illustrated in FIG. 2.

The color measurement value acquisition unit 308 is a functional unit that acquires a color measurement value (Lab value) for which color measurement is performed by the colorimeter 233. The color measurement value acquisition unit 308 acquires a color measurement value (Lab value) in the device independent color space (Lab color space) with respect to a patch, for which C, M, Y, K, and NM are combined for each gradation value and which is included in the chart image data, by color measurement that is performed by the colorimeter 233 with respect to a recording medium of the chart image data that is printed out by the printer 231 instructed by the image output unit 306. Meanwhile, the colorimeter 233 may perform color measurement in accordance with operation performed by the user to slide the colorimeter 233 on the recording medium of the chart image data or may perform color measurement in accordance with detection of output of the chart image data in the printer (the printer 231). The color measurement value acquisition unit 308 is implemented by, for example, a program that is executed by the CPU 201 illustrated in FIG. 2.

The color reproduction characteristic generation unit 309 is a functional unit that generates a color reproduction characteristic that associates a CMYK+NM value of CMYK+NM chart image data received from the chart image generation unit 307 with the color measurement value (Lab value) of the recording medium printed out by the printer 231, where the color measurement value is acquired by the color measurement value acquisition unit 308. The color reproduction characteristic generation unit 309 sends the generated color reproduction characteristic to the 5-color profile generation unit 303. The color reproduction characteristic generation unit 309 is implemented by, for example, a program that is executed by the CPU 201 illustrated in FIG. 2.

Meanwhile, at least a part of the functional units implemented by software (program) among the functional units of the controller 200 illustrated in FIG. 3 may be realized by a hardware circuit, such as a field-programmable gate array (FPGA) or an ASIC.

Furthermore, each of the functional units of the controller 200 illustrated in FIG. 3 is a functionally conceptual, and need not always be configured in the manner illustrated in the drawings. For example, a plurality of functional units that are illustrated as independent functional units in the controller 200 illustrated in FIG. 3 may be configured as a single functional unit. Alternatively, functions of a single functional unit in the controller 200 illustrated in FIG. 3 may be divided into a plurality of functions and a plurality of functional units may be configured.

Process of Generating NM Device Value Table

Figure 12:
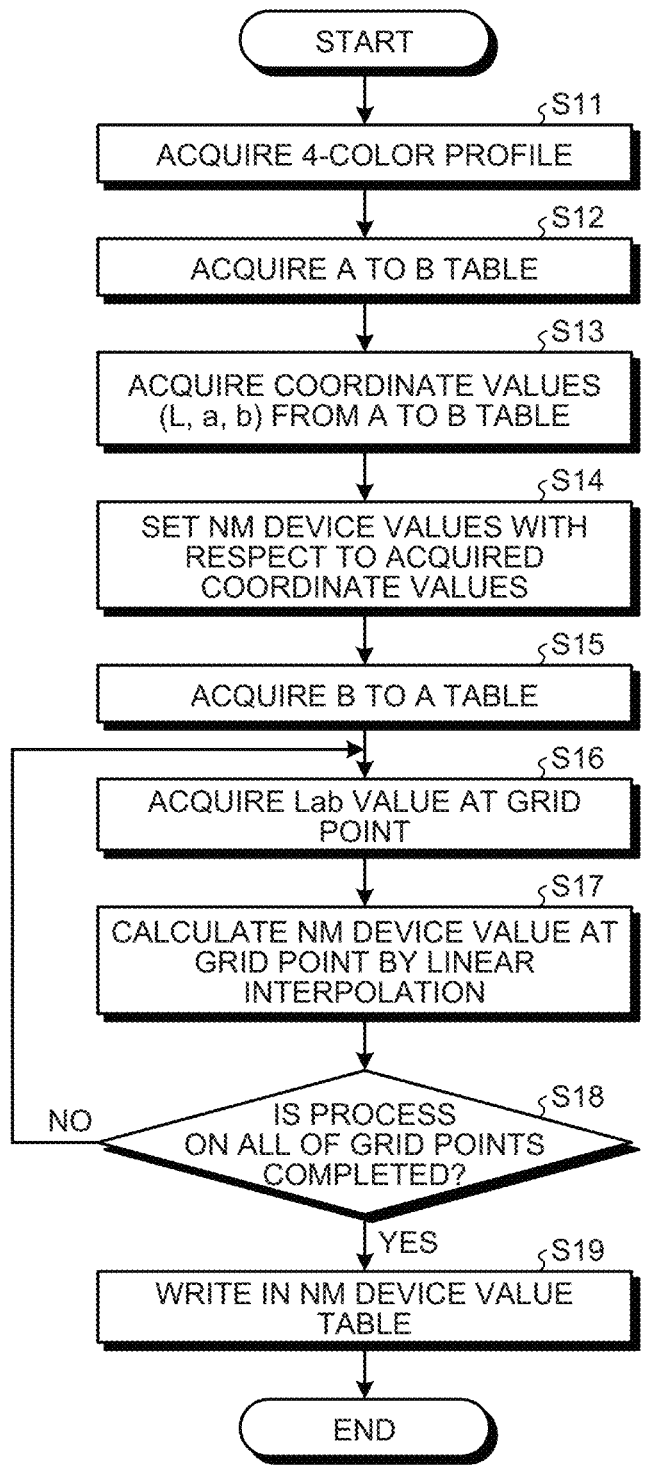
FIG. 12 is a flowchart illustrating an example of the flow of a process of generating an NM device value table by the image forming apparatus according to the first embodiment.

FIG. 12 is a flowchart illustrating an example of the flow of a process of generating the NM device value table by the image forming apparatus according to the first embodiment. The flow of the process of generating the NM device value table by the image forming apparatus 10 according to the present embodiment will be described below with reference to FIG. 12.

Step S11

First, the fluorescent color device value setting unit 310 acquires the 4-color profile from the storage unit 301 via the data input-output unit 302. Then, the process proceeds to Step S12.

Step S12

The fluorescent color device value setting unit 310 acquires the A to B table (for example, see FIG. 7) from the acquired 4-color profile. Then, the process proceeds to Step S13.

Step S13

The fluorescent color device value setting unit 310 acquires Lab values (coordinate values (L, a, b)) as grid point information from the acquired A to B table for the 4-color profile. Here, for example, the 5-color profile generation unit 303 acquires, from the A to B table for the 4-color profile, Lab(P0), Lab(P1), Lab(P2), Lab(P3), Lab(P4), Lab(P5), Lab(P6), Lab(BP), and Lab(WP) that are Lab values at the points P0 to P6, BP, and WP. Then, the process proceeds to Step S14.

Step S14

The fluorescent color device value setting unit 310 sets the device values (NM) of fluorescent magenta at the points P0 to P6, BP, and WP as illustrated in FIG. 9 and FIG. 10 as described above. Then, the process proceeds to Step S15.

Step S15

Subsequently, the fluorescent color device value setting unit 310 acquires the B to A table (for example, see FIG. 5) from the acquired 4-color profile. Then, the process proceeds to Step S16.

Step S16

The fluorescent color device value setting unit 310 extracts a single Lab value as the grid point information from the acquired B to A table for the 4-color profile. Then, the process proceeds to Step S17.

Step S17

Then, the fluorescent color device value setting unit 310 calculates, by linear interpolation as described above, a device value NM of fluorescent magenta (second dot percentage) corresponding to a point that is on the ab plane of coordinates and that is indicated by the Lab value (second color value) extracted at Step S16, by using the Lab values corresponding to the points P0 to P6, BP, and WP acquired at Step S13 and the device values NM of fluorescent magenta corresponding to the points P0 to P6, BP, and WP set at Step S14. Then, the process proceeds to Step S18.

Step S18

If the process of calculating the device values of fluorescent magenta NM with respect to the Lab values at all of the grid points in the B to A table is completed (YES at Step S18), the process proceeds to Step S19, and if the process is not completed (NO at Step S18), the process proceeds to Step S16.

Step S19

The fluorescent color device value setting unit 310 generates the NM device value table by writing, in the NM device value table, the device values NM calculated at Step S17 in association with the Lab values extracted at Step S16. Thus, the process of generating the NM device value table is completed.

Process of Generating 5-Color Profile

Figure 13:
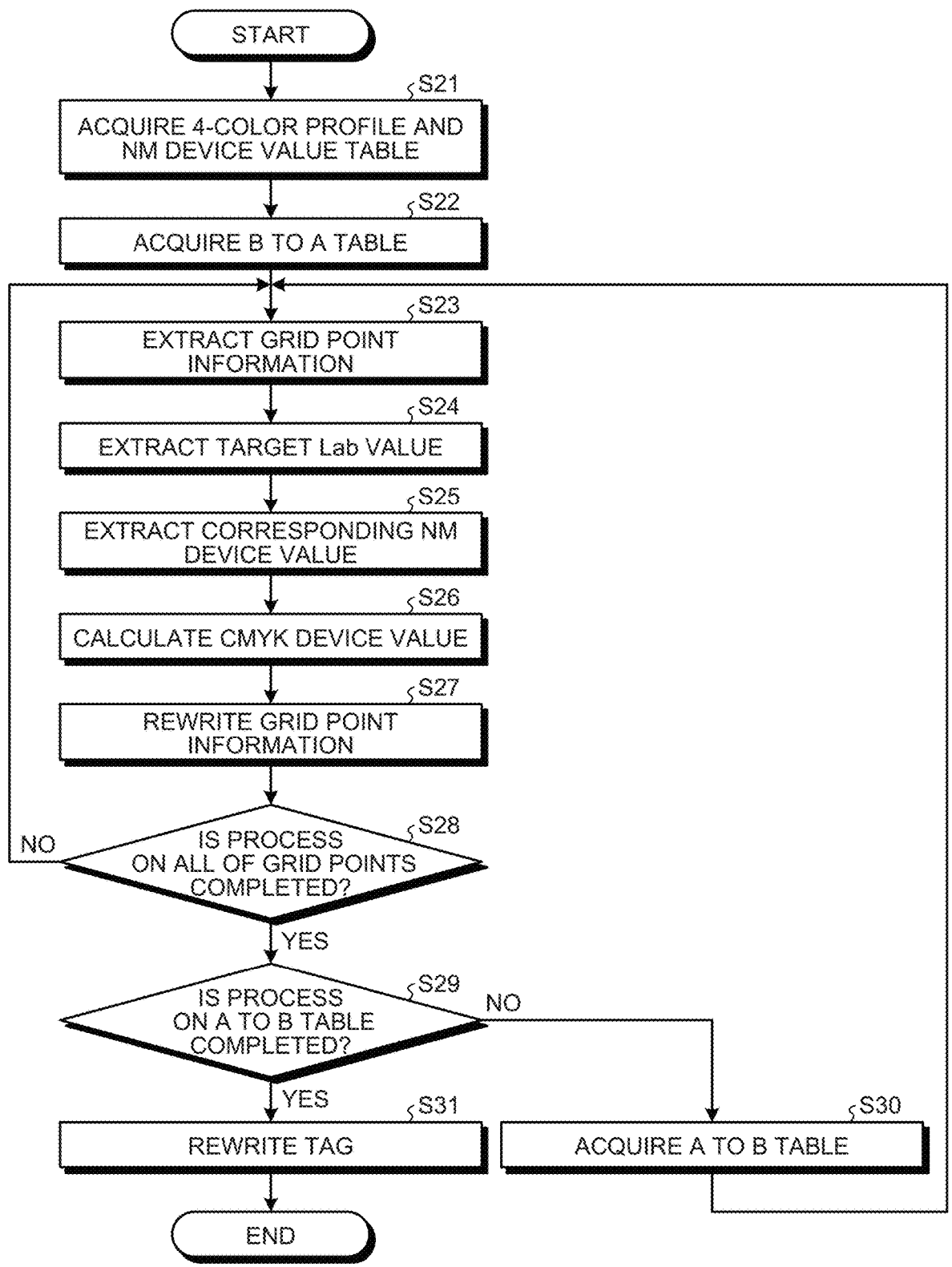
FIG. 13 is a flowchart illustrating an example of the flow of a process of generating a 5-color profile by the image forming apparatus according to the first embodiment.

FIG. 13 is a flowchart illustrating an example of the flow of a process of generating the 5-color profile by the image forming apparatus according to the first embodiment. The flow of the process of generating the 5-color profile by the image forming apparatus 10 according to the first embodiment will be described below with reference to FIG. 13.

Step S21

First, the 5-color profile generation unit 303 acquires the 4-color profile and the NM device value table generated by the fluorescent color device value setting unit 310 from the storage unit 301 via the data input-output unit 302. Then, the process proceeds to Step S22

Step S22

The 5-color profile generation unit 303 acquires the B to A table (for example, see FIG. 5) from the acquired 4-color profile. Then, the process proceeds to Step S23.

Step S23

The 5-color profile generation unit 303 acquires a single piece of grid point information from the acquired B to A table for the 4-color profile. Then, the process proceeds to Step S24.

Step S24

The 5-color profile generation unit 303 extracts a Lab value included in the acquired grid point information as a target Lab value. Then, the process proceeds to Step S25.

Step S25

The 5-color profile generation unit 303 refers to the NM device value table stored in the storage unit 301 via the data input-output unit 302, and extracts the device value NM of fluorescent magenta corresponding to the target Lab value. Then, the process proceeds to Step S26.

Step S26

The 5-color profile generation unit 303 fixes the extracted device value NM of fluorescent magenta, and calculates a CMYK value (one example of a third dot percentage) that reproduces the target Lab value by using the fixed device value NM and the color reproduction characteristic generated by the color reproduction characteristic generation unit 309. Then, the process proceeds to Step S27.

Step S27

Then, the 5-color profile generation unit 303 rewrites the CMYK value corresponding to the target Lab value in the B to A table for the 4-color profile with the device value NM extracted at Step S25 and the calculated CMYK value.

Step S28

If the process of calculating the CMYK value for the target Lab value is completed on all of the grid points (YES at Step S28), the process proceeds to Step S29, and if the process is not completed (NO at Step S28), the process returns to Step S23.

Step S29

If the 5-color profile generation unit 303 completes the process on the A to B table for the 4-color profile (YES at Step S29), the process proceeds to Step S31, and if the process is not completed (NO at Step S29), the process proceeds to Step S30.

Step S30

The 5-color profile generation unit 303 acquires the A to B table (for example, see FIG. 7) from the acquired 4-color profile. Then, the process returns to Step S23, and the 5-color profile generation unit 303 performs the processes from Steps S23 to S28 with respect to the A to B table. In summary, the 5-color profile generation unit 303 adds the set device value NM to the CMYK value included in the grid point information in the A to B table to realize extension to five colors, and, similarly to the above, the 5-color profile generation unit 303 calculates a Lab value by using the color reproduction characteristic and rewrites a Lab value in the grid point information in the A to B table with the calculated Lab value.

In other words, the 5-color profile generation unit 303 rewrites both of the device value and the Lab value in the A to B table, but rewrites only the device value in the B to A table without rewriting the Lab value that constitutes a profile connection space (PCS).

Step S31

Through the process as described above, if the B to A table and the A to B table for the 5-color profile are generated with respect to the B to A table and the A to B table for the 4-color profile, the 5-color profile generation unit 303 rewrites a tag that is needed for extension to the 5-color profile. Then, the process of generating the 5-color profile is completed.

Meanwhile, in the process of generating the 5-color profile as described above, operation in which the CMYK value is calculated from the device value NM of fluorescent magenta and the target Lab value by using the color reproduction characteristic has been described, but embodiments are not limited to this example. For example, if the way to input K (black) is set in advance by taking into account granularity, it is possible to realize a configuration that calculates a CMY value (device values of C, M, and Y) from the device value NM of fluorescent magenta, a device value of K, and the target Lab value by using the color reproduction characteristic.

Print Processing by Image Forming Apparatus

Figure 14:
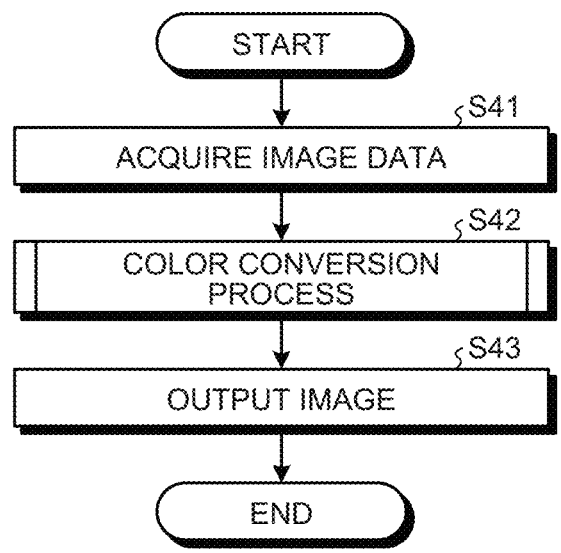
FIG. 14 is a flowchart illustrating an example of the flow of a printing process performed by the image forming apparatus according to the first embodiment.
Figure 15:
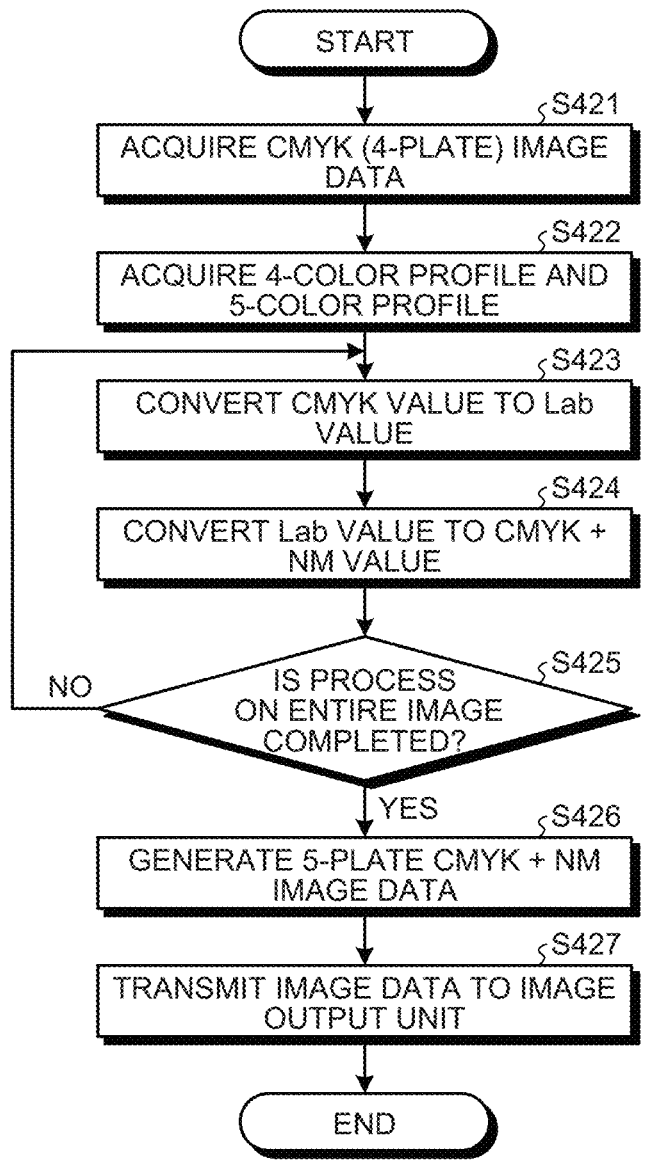
FIG. 15 is a flowchart illustrating an example of the flow of a color conversion process in the printing process performed by the image forming apparatus according to the first embodiment.

FIG. 14 is a flowchart illustrating an example of the flow of a printing process performed by the image forming apparatus according to the first embodiment. FIG. 15 is a flowchart illustrating an example of a color conversion process in the printing process performed by the image forming apparatus according to the first embodiment. With reference to FIG. 14 and FIG. 15, the flow of the printing process performed by the image forming apparatus 10 according to the present embodiment will be described. Meanwhile, it is assumed that the 5-color profile as described above with reference to FIG. 13 is generated and stored in the storage unit 301 in advance.

Step S41

First, if a user performs operation of executing printing of image data via the operation display unit 210, the image data acquisition unit 304 acquires 4-plate CMYK image data via the network N. Then, the process proceeds to Step S42.

Step S42

The image forming apparatus 10 performs the color conversion process as illustrated in FIG. 15. The color conversion process is performed with the flow of Steps S421 to S427.

Step S421

The source profile conversion unit 3051 of the color conversion unit 305 acquires the 4-plate CMYK image data that is acquired by the image data acquisition unit 304. Then, the process proceeds to Step S422.

Step S422

The source profile conversion unit 3051 acquires the 4-color profile from the storage unit 301 via the data input-output unit 302. The printer profile conversion unit 3052 of the color conversion unit 305 acquires the 5-color profile from the storage unit 301 via the data input-output unit 302. Then, the process proceeds to Step S423.

Step S423

Subsequently, the source profile conversion unit 3051 converts a CMYK value of a pixel included in the acquired 4-plate CMYK image data to a Lab value by using the acquired 4-color profile (the A to B table). Then, the source profile conversion unit 3051 sends the converted Lab value to the printer profile conversion unit 3052. Then, the process proceeds to Step S424.

Step S424

The printer profile conversion unit 3052 converts the Lab value received from the source profile conversion unit 3051 to a CMYK+NM value by using the acquired 5-color profile (the B to A table), and replaces a CMYK value of the target pixel in the 4-plate CMYK image data with the CMYK+NM value. Then, the process proceeds to Step S425.

Step S425

If the process of conversion and replacement to the CMYK+NM values is completed with respect to all of pixels in the 4-plate CMYK image data (YES at Step S425), the process proceeds to Step S426, and if the process is not completed with respect to all of the pixels (NO at Step S425), the process returns to Step S423.

Step S426

The printer profile conversion unit 3052 generates, as 5-plate CMYK+NM image data, image data in which all of the CMYK values of the pixels included in the 4-plate CMYK image data are replaced with the CMYK+NM values. The CMYK+NM values included in the 5-plate CMYK+NM image data are device values that depend on the printer (the printer 231). Then, the process proceeds to Step S427.

Step S427

The printer profile conversion unit 3052 transmits the generated 5-plate CMYK+NM image data to the image output unit 306. Then, the color the conversion process is completed and the process returns to Step S43 in FIG. 14.

Step S43

The image output unit 306 outputs the 5-plate CMYK+NM image data obtained through the color conversion performed by the color conversion unit 305 to the printer (the printer 231), and causes the printer to perform printing. Specifically, if the image data received from the color conversion unit 305 is 5-plate data, the image output unit 306 confirms that toner in a fifth station of the printer 231 is fluorescent magenta, and if toner of a different color is mounted, the image output unit 306 causes the operation display unit 210 to display a notice indicating a request for exchange of a toner bottle or the like, for example. Furthermore, if toner of fluorescent magenta is mounted, the image output unit 306 outputs the 5-plate CMYK+NM image data to the printer (the printer 231) and causes the printer to perform printing.

As described above, in the image forming apparatus 10 according to the present embodiment, the 5-color profile generation unit 303 generates the 5-color profile from the 4-color profile through the flow as described above with reference to FIG. 13, the color conversion unit 305 converts the 4-plate CMYK image data to Lab values by the 4-color profile and converts the Lab values to the CMYK+NM values by the 5-color profile, so that color conversion to the 5-plate CMYK+NM image data is performed. With this configuration, an algorithm for color conversion is established, and it becomes easy to generate image data when a fluorescent color different from the process colors is used.

Meanwhile, in the embodiment as described above, the device value is calculated for fluorescent magenta (NM) that is a fluorescent color corresponding to magenta (M) that is the process color, and the 5-color profile is generated, but embodiments are not limited to this example. For example, it may be possible to calculate a device color of a fluorescent color corresponding to cyan (C) or yellow (Y) among the process colors, and generate the 5-color profile.

Second Embodiment

An image forming apparatus according to a second embodiment will be described below mainly in terms of a difference from the image forming apparatus 10 according to the first embodiment. In the first embodiment, the operation has been described in which the device value NM of fluorescent magenta is set such that 0<NM except for the origin and fluorescent magenta is inevitably added with respect to neighboring colors with hues of magenta. In the present embodiment, operation will be described in which even with respect to the neighboring colors with hues of magenta, fluorescent magenta is not added in the vicinity of an achromatic color. Meanwhile, a hardware configuration and a functional block configuration of the image forming apparatus according to the present embodiment are the same as those of the first embodiment.

Figure 16:
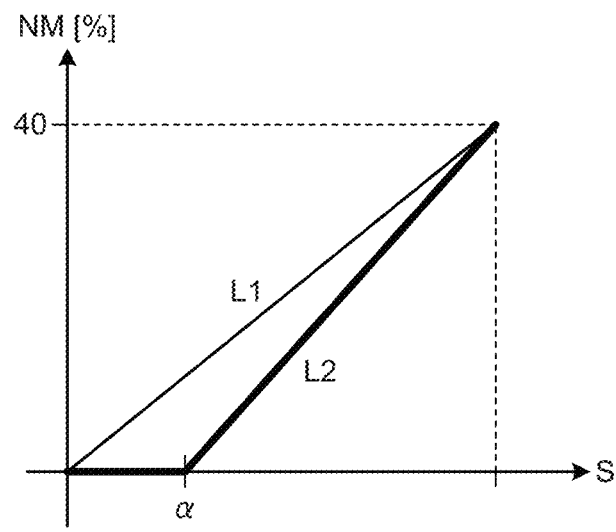
FIG. 16 is a graph illustrating an example of a relationship between saturation and a device value.
Figure 17:
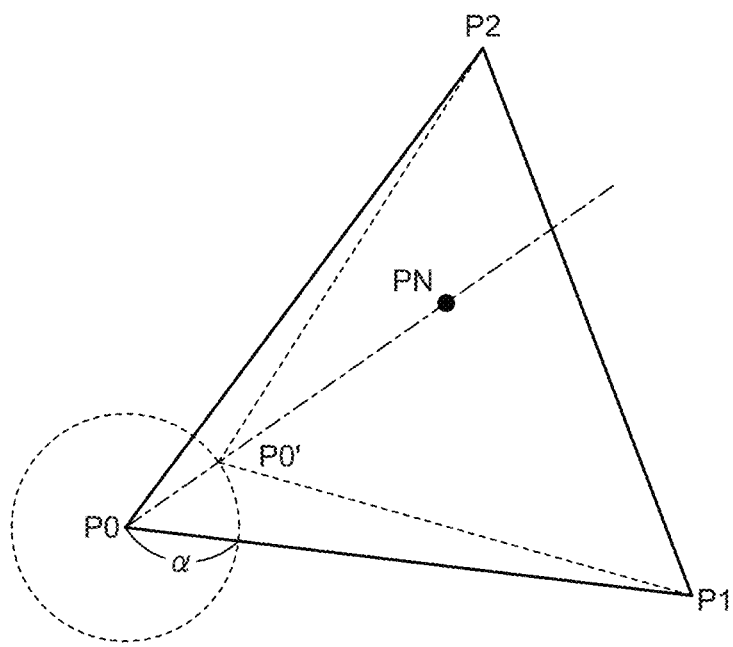
FIG. 17 is a diagram for explaining a process of calculating a device value of fluorescent magenta by linear interpolation in a second embodiment.

FIG. 16 is a graph illustrating an example of a relationship between saturation and a device value. FIG. 17 is a diagram for explaining a process of calculating a device value of fluorescent magenta by linear interpolation in the second embodiment. With reference to FIG. 16 and FIG. 17, operation of setting the device value of fluorescent magenta by the fluorescent color device value setting unit 310 of the image forming apparatus 10 according to the present embodiment will be described.

The graph illustrated in FIG. 16 is a graph in which the horizontal axis represents saturation S and the vertical axis represents the device value NM [%] of fluorescent magenta. For example, if a straight line connecting the origin (the point P0) and the point P2 illustrated in FIG. 9 is adopted as the horizontal axis in FIG. 16, the device value NM corresponding to the saturation S at the point P2 is 40 [%]. In this case, the straight line L1 illustrated in FIG. 16 indicates a characteristic that is adopted when the fluorescent color device value setting unit 310 calculates the device value NM in the first embodiments as described above. In other words, if the characteristic indicated by the straight line L1 is adopted, 0<NM at points other than the origin (the point P0) with respect to the neighboring colors with hues of magenta, and fluorescent magenta is inevitably added. Here, to eliminate fluorescent magenta in the vicinity of an achromatic color, it is sufficient to calculate the device value NM on the basis of a characteristic indicated by a straight line L2 illustrated in FIG. 16. In other words, the device value NM=0 if the saturation S is smaller than a predetermined value a.

Specifically, at Step S17 illustrated in FIG. 12, the fluorescent color device value setting unit 310 obtains the saturation S corresponding to the Lab value extracted at Step S16, and if the saturation S is smaller than the predetermined value a (in other words, if the Lab value is included in a range of a sphere with a radius a centered at the point P0 (one example of a predetermined range)), the fluorescent color device value setting unit 310 calculates the device value NM corresponding to the Lab value such that NM is zero. In contrast, if the saturation S is equal to or larger than the predetermined value a, as illustrated in FIG. 17, the fluorescent color device value setting unit 310 sets, as a new origin, a point P0' at which a straight line connecting the origin (the point P0) and a point PN corresponding to the Lab value extracted at Step S16 intersect with a circle with the radius a, and sets the device value NM of fluorescent magenta corresponding to the point P0' to 0 [%]. Then, the fluorescent color device value setting unit 310 calculates the device value NM of fluorescent magenta at the point PN on the ab plane of coordinates by linear interpolation using the ratio of internal division (internal division ratio) by using device values of fluorescent magenta at the points P1, P2, and P0' that form a triangle enclosing the point PN, similarly to the first embodiment.

Through the process performed by the image forming apparatus 10 according to the present embodiment as described above, it is possible to achieve the same effects as those of the first embodiment, and prevent occurrence of metamerism.

Third Embodiment

An image forming apparatus according to a third embodiment will be described below mainly in terms of a difference from the image forming apparatus 10 according to the first embodiment. In the first embodiment, the operation has been described in which the color conversion is performed using fluorescent magenta in the range of the gamut of the process colors. In the printing industries, electronic submission using RGB data is increasing, and in recent years, it is often the case that a sRGB color space or an Adobe RGB color space is used for an input image. If it is possible to cope with a wide range of gamut by introducing a fluorescent color material, it becomes possible to cope with a color that is defined by the color space of the input image as described above and that is not reproducible by using only the process colors. In the present embodiment, operation of generating a profile corresponding to a wide gamut that is not reproducible by a gamut of the process colors will be described. Meanwhile, a hardware configuration and a functional block configuration of the image forming apparatus according to the present embodiment are the same as those of the first embodiment.

Figure 18:
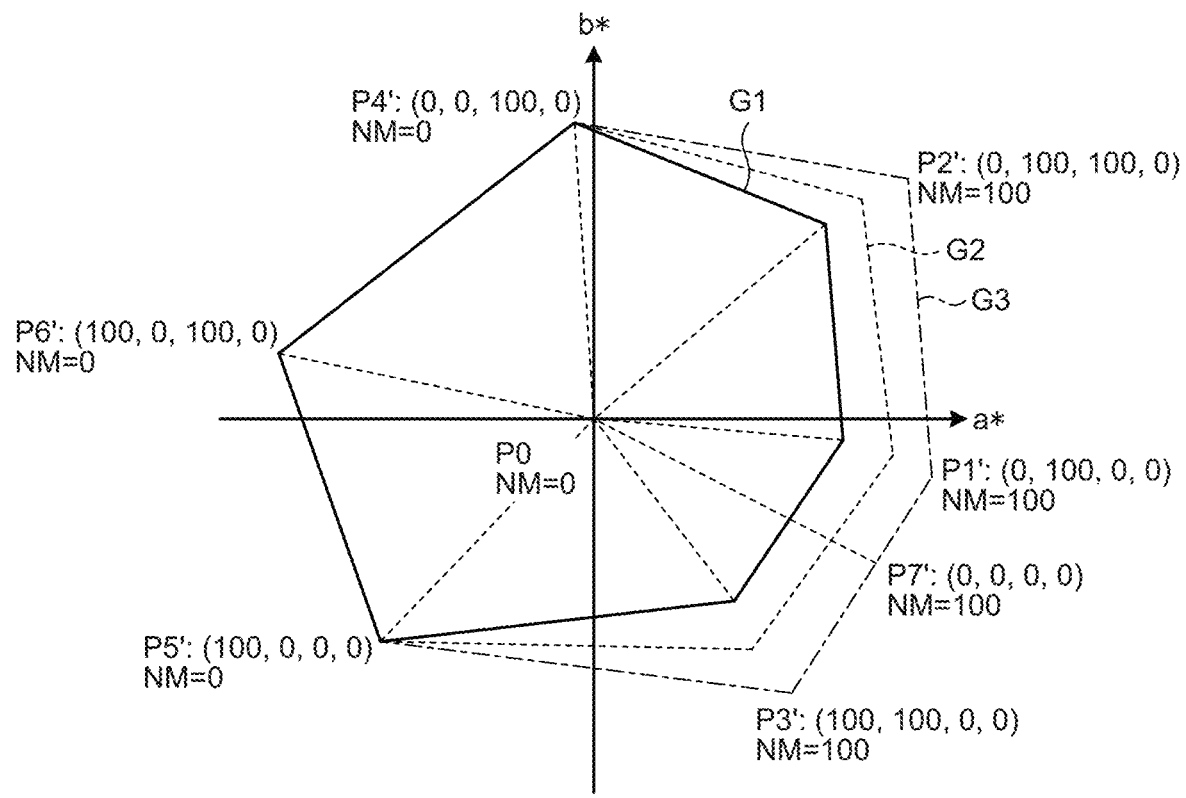
FIG. 18 is a diagram for explaining operation of generating a profile for a wide gamut.
Figure 19:
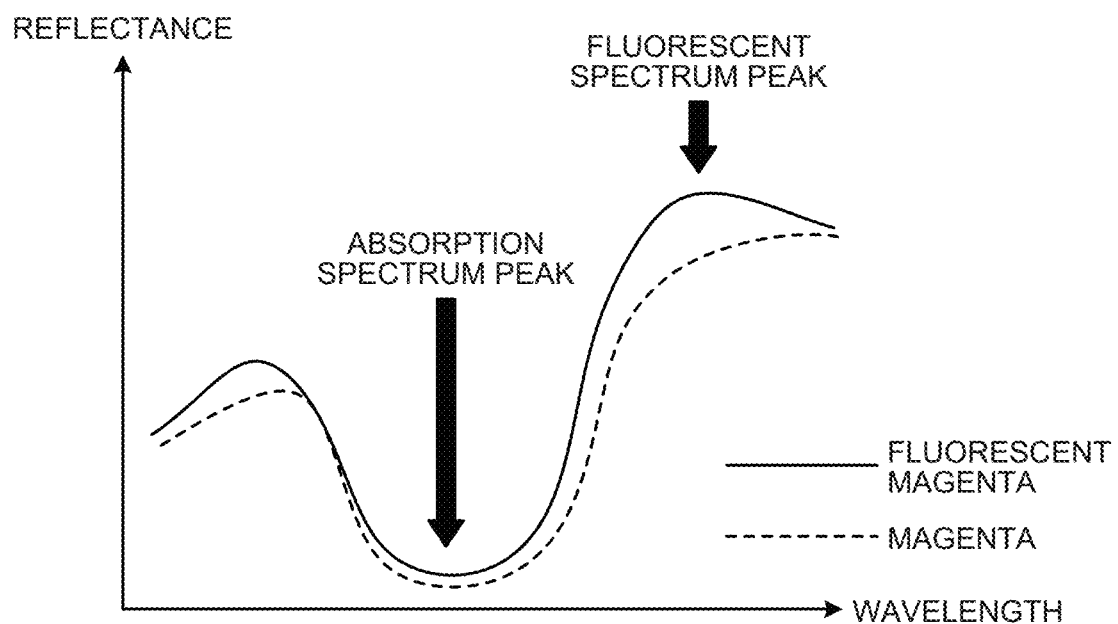
FIG. 19 is a diagram illustrating spectral distribution characteristics of fluorescent magenta and magenta that is a process color.

FIG. 18 is a diagram for explaining operation of generating a profile for a wide gamut. With reference to FIG. 18, operation of generating the 5-color profile by the image forming apparatus 10 according to the present embodiment will be described below.

The image data acquisition unit 304 acquires RGB image data from, for example, the PC 20 or the like via the network N.

The source profile conversion unit 3051 of the color conversion unit 305 acquires the source profile from the storage unit 301 via the data input-output unit 302, and converts an RGB value of each of pixels included in the RGB image data acquired from the image data acquisition unit 304 to a Lab value by using the source profile. The source profile conversion unit 3051 sends the converted Lab values to the printer profile conversion unit 3052.

Here, the source profile is prepared on the assumption that an RGB value based on sRGB or Adobe RGB is to be input, and used for conversion from RGB values to Lab values. The color space defined by sRGB or Adobe RGB is larger than the color space defined by the process colors (CMYK), and therefore, the Lab values converted using the source profile include colors that are not expressed by the process colors.

The printer profile conversion unit 3052 of the color conversion unit 305 acquires the 5-color profile (printer profile) from the storage unit 301 via the data input-output unit 302, and generates 5-plate image data by converting the Lab values received from the source profile conversion unit 3051 to CMYK+NM values by using the 5-color profile. The printer profile conversion unit 3052 sends the converted 5-plate CMYK+NM image data to the image output unit 306. In this manner, the operation performed by the printer profile conversion unit 3052 is the same as the operation as described above in the first embodiment, but the method of generating the 5-color profile (printer profile) that is acquired via the data input-output unit 302 is different from the first embodiment. The method of generating the 5-color profile in the present embodiment will be described below.

In the first embodiment as described above, the gamut of the process colors is recognized from the 4-color profile that serves as the source profile used for conversion from CMYK values to Lab values; however, in the present embodiment, the gamut is recognized from the color reproduction characteristic (one example of the information defining a gamut) generated by the color reproduction characteristic generation unit 309, and the device value of fluorescent magenta is set based on the gamut.

In FIG. 18, a gamut G1 is a gamut of only the process colors, a gamut G2 is a gamut of the process colors and fluorescent magenta with a maximum dot percentage of 40 [%], and a gamut G3 is a gamut of the process color and fluorescent magenta with a maximum dot percentage of 100 [%]. The gamut G3 can be recognized by acquiring color values (Lab values) from the color reproduction characteristic that defines a relationship between the CMYK+NM values and the color measurement values (Lab values as color values) and that is generated by the color reproduction characteristic generation unit 309. The fluorescent color device value setting unit 310 (acquisition unit) acquires, from the color reproduction characteristic, Lab values (one example of the first color values) defined at points P1' to P6' that are obtained by following device values (CMYK+NM values) in the Lab color space. Here, for example, the Lab value at the point P1' is represented by Lab(P1').

P1': (C, M, Y, K, NM)=(0, 100, 0, 0, 100)
P2': (C, M, Y, K, NM)=(0, 100, 100, 0, 100)
P3': (C, M, Y, K, NM)=(100, 100, 0, 0, 100)
P4': (C, M, Y, K, NM)=(0, 0, 100, 0, 0)
P5': (C, M, Y, K, NM)=(100, 0, 0, 0, 0)
P6': (C, M, Y, K, NM)=(100, 0, 100, 0, 0)

The gamut G3 illustrated in FIG. 18 is a gamut that is generated by plotting the points P1' to P6' on the ab plane of coordinates in the Lab color space. Among the points, the points P1' and P4' correspond to hues of magenta (M) and yellow (Y), which are the primary colors of the process colors, and a hue of fluorescent magenta (NM), the points P2' and P3' correspond to hues of red and blue, which are the secondary colors of the process colors, and a hue of fluorescent magenta (NM), the point P5' corresponds to a hue of cyan (C) that is the primary color of the process colors, and the point P6' corresponds to a hue of green that is the secondary color of the process colors. Further, in FIG. 18, a point P7' indicates a Lab value for which the device value of fluorescent magenta (NM) is 100%, and a point P0 indicates an origin.

Then, on the ab plane of coordinates, the fluorescent color device value setting unit 310 (setting unit) sets NM=0 [%] (first dot percentage) at the points P0 (origin), P4', P5', and P6', and sets NM=100 [%] (first dot percentage) at the points P1', P2', and P3'. Further, the fluorescent color device value setting unit 310 (calculation unit) calculates the device value of fluorescent magenta at each of arbitrary points (Lab values) (second color values) in the gamut of the Lab color space (the ab plane of coordinates in FIG. 18) that is defined by the points P1' to P6', by linear interpolation using the points P0, P1' to P7', the point WP, and the point BP (one example of the first color values). The calculation method using linear interpolation is the same as the calculation method explained in the first embodiment.

In reality, with respect to all of Lab values corresponding to all of the grid points in the B to A table for the 4-color profile as illustrated in FIG. 5, the fluorescent color device value setting unit 310 calculates the device values of fluorescent magenta by linear interpolation as described above, and generates the NM device value table in which the Lab values and the calculated device values of fluorescent magenta are associated. The process of generating the NM device value table is the same as the process as described above with reference to FIG. 12. The fluorescent color device value setting unit 310 stores the generated NM device value table in the storage unit 301 via the data input-output unit 302.

The 5-color profile generation unit 303 (generation unit) receives the 4-color profile from the storage unit 301 via the data input-output unit 302, obtains the device values of CMYK and fluorescent magenta (NM) by using the color reproduction characteristic generated by the color reproduction characteristic generation unit 309 and the NM device value table generated by the fluorescent color device value setting unit 310, and generates the 5-color profile (first profile). The process of generating the 5-color profile is the same as the process described above with reference to FIG. 13.

As described above, in the image forming apparatus 10 according to the present embodiment, the gamut is recognized based on the color reproduction characteristic generated by the color reproduction characteristic generation unit 309 and then fluorescent magenta is set, so that it is possible to generate a printer profile (5-color profile) that represents colors that are not reproducible by the process colors as in the color space based on RGB image data.

Meanwhile, in each of the embodiments as described above, if at least any of the functional units of the controller 200 of the image forming apparatus is implemented by execution of a program, the program is distributed by being incorporated in a ROM or the like in advance. Further, in each of the embodiments as described above, the program executed by the controller 200 of the image forming apparatus may be provided by being recorded in a computer readable recording medium, such as a CD-ROM, a flexible disk (FD), a CD-recordable (CD-R), or a digital versatile disk (DVD), in a computer-installable or computer-executable file format. Furthermore, in each of the embodiments as described above, the program executed by the controller 200 of the image forming apparatus may be stored in a computer connected to a network, such as the Internet, and may be provided by download via the network. Moreover, in each of the embodiments as described above, the program executed by the controller 200 of the image forming apparatus may be provided or distributed via the network, such as the Internet. Furthermore, in each of the embodiments as described above, the program executed by the controller 200 of the image forming apparatus has a module structure including at least any of the functional units as described above, and as actual hardware, the CPU 201 reads a program from the storage device as described above (for example, the system memory 202, the auxiliary storage device 208, or the like) and executes the program, so that each of the functional units is loaded and generated onto the main storage device.

According to an embodiment, it is possible to easily generate image data when a fluorescent color different from process colors is used.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
processing circuitry configured to,
acquire a plurality of first color values in a device independent color space, from information defining a predetermined gamut;
set, for the plurality of first color values, first dot percentages of a fluorescent color to either a preset value greater than zero or to zero based on a result of analyzing a dot percentage of a process color in a same color system as the fluorescent color;
select ones of the plurality of first color values that form a figure surrounding a second color value corresponding to the fluorescent color on the device independent color space;
calculate a second dot percentage of the fluorescent color corresponding to the second color value in the device independent color space, based on coordinates of the second color value on the device independent color space, coordinates of the selected ones of the plurality of first color values forming the figure surrounding the second color value on the device independent color space, and the first dot percentages of the plurality of first color values; and generate a first profile to convert the second color value to dot percentages of a process color and the fluorescent color, based on the second color value and the second dot percentage.

2. The image processing apparatus according to claim 1, wherein the processing circuitry is configured to acquire the plurality of first color values from a second profile to convert dot percentages of colors including a process color to color values in the device independent color space, as the information defining the gamut.

3. The image processing apparatus according to claim 2, wherein the processing circuitry is configured to set a predetermined first dot percentage being not zero, with respect to a first color value for which a dot percentage of a process color in a same color system as the fluorescent color is not zero among the plurality of first color values acquired from the information defining the gamut.

4. The image processing apparatus according to claim 2, wherein the processing circuitry is configured to set zero as a first dot percentage with respect to a first color value for which a dot percentage of a process color in a same color system as the fluorescent color is zero among the plurality of first color values acquired from the information defining the gamut.

5. The image processing apparatus according to claim 1, wherein the processing circuitry is configured to acquire the plurality of first color values from a color reproduction characteristic associating dot percentages of a process color and the fluorescent color with color values measured by a colorimeter with respect to a recording medium of a chart image defined by the dot percentages, as the information defining the gamut.

6. The image processing apparatus according to claim 5, wherein the processing circuitry is configured to set a predetermined first dot percentage being not zero, with respect to a first color value for which a dot percentage of a process color in a same color system as the fluorescent color is not zero among the plurality of first color values acquired from the information defining the gamut.

7. The image processing apparatus according to claim 5, wherein the processing circuitry is configured to set zero as a first dot percentage with respect to a first color value for which a dot percentage of a process color in a same color system as the fluorescent color is zero among the plurality of first color values acquired from the information defining the gamut.

8. The image processing apparatus according to claim 1, wherein the processing circuitry is configured to calculate the second dot percentage corresponding to the second color value by an interpolation process based on a relationship between the plurality of first color values and the first dot percentages.

9. The image processing apparatus according to claim 8, wherein the processing circuitry is configured to, using a point group corresponding to first color values at three or more points enclosing a point corresponding to the second color value in the device independent color space, calculate the second dot percentage corresponding to the second color value, based on an internal division ratio in accordance with distances between the point and the point group.

10. The image processing apparatus according to claim 1, wherein the processing circuitry is configured to calculate that the second dot percentage corresponding to the second color value included in a predetermined range including a point at which saturation is zero in the device independent color space.

11. The image processing apparatus according to claim 1, wherein the processing circuitry is configured to
calculate a third dot percentage of at least a part of a process color, the third dot percentage reproducing the second color value corresponding to the second dot percentage, while fixing at least the second dot percentage, using a color reproduction characteristic associating dot percentages of a process color and the fluorescent color with a color value measured by a colorimeter with respect to a recording medium of a chart image defined by the dot percentages, and
generate the first profile to convert the second color value to the third dot percentage of the process color and the second dot percentage of the fluorescent color.

12. The image processing apparatus according to claim 1, wherein the plurality of first color values include color values corresponding to primary colors and a secondary color of process colors.

13. The image processing apparatus according to claim 12, wherein the plurality of first color values include a maximum lightness point and a minimum lightness point in the device independent color space.

14. The image processing apparatus according to claim 1, wherein the fluorescent color has an absorption spectrum peak in a same band as a process color in a same color system as the fluorescent color, and has a fluorescent spectrum peak on a long wavelength side of the absorption spectrum peak.

15. The image processing apparatus according to claim 1, wherein the fluorescent color is fluorescent magenta.

16. The image processing apparatus according to claim 1, wherein the processing circuitry is configured to set, for the plurality of first color values, the first dot percentages of the fluorescent color based on the plurality of first color values by,
setting the first dot percentage of a respective one of the first color values to zero, in response to the dot percentage of the process color in the same color system as the fluorescent color being zero, and
setting the first dot percentage of the respective one of the first color values to the preset value greater than zero, in response to the dot percentage of the process color in the same color system as the fluorescent color being greater than zero.

17. The image processing apparatus according to claim 1, wherein the selected ones of the plurality of first color values include three or more of the first color values that enclose the second color value when plotted in the device independent color space.

18. The image processing apparatus according to claim 17, wherein the processing circuitry is configured to calculate the second dot percentage corresponding to the second color value based on distances between a point corresponding to the second color value in the device independent color space and a point group corresponding to the three or more first color values that enclose the point.

19. An image processing method comprising:
acquiring a plurality of first color values in a device independent color space, from information defining a predetermined gamut;
setting, for the plurality of first color values, first dot percentages of a fluorescent color to either a preset value greater than zero or to zero based on a result of analyzing a dot percentage of a process color in a same color system as the fluorescent color;

selecting ones of the plurality of first color values that form a figure surrounding a second color value corresponding to the fluorescent color on the device independent color space;

calculating a second dot percentage of the fluorescent color corresponding to a second color value in the device independent color space, based on coordinates of the second color value on the device independent color space, coordinates of the selected ones of the plurality of first color values forming the figure surrounding the second color value on the device independent color space, and the first dot percentages of the plurality of first color values; and generating a first profile to convert the second color value to dot percentages of a process color and the fluorescent color, based on the second color value and the calculated second dot percentage.

20. A non-transitory computer-readable medium including programmed instructions that cause a computer to execute:

acquiring a plurality of first color values in a device independent color space, from information defining a predetermined gamut;

setting, for the plurality of first color values, first dot percentages of a fluorescent color either a preset value greater than zero or to zero based on a result of analyzing a dot percentage of a process color in a same color system as the fluorescent color;

selecting ones of the plurality of first color values that form a figure surrounding a second color value corresponding to the fluorescent color on the device independent color space;

calculating a second dot percentage of the fluorescent color corresponding to a second color value in the device independent color space, based on coordinates of the second color value on the device independent color space, coordinates of the selected ones of the plurality of first color values forming the figure surrounding the second color value on the device independent color space, and the first dot percentages of the plurality of first color values; and generating a first profile to convert the second color value to dot percentages of a process color and the fluorescent color, based on the second color value and the calculated second dot percentage.

* * * * *